United States Patent [19]

Taguchi

[11] Patent Number: 4,700,596
[45] Date of Patent: Oct. 20, 1987

[54] METHOD AND APPARATUS FOR CONTROLLING THE FEEDING OF A BANDSAW BLADE IN BANDSAW MACHINES

[75] Inventor: Masayuki Taguchi, Hatano, Japan

[73] Assignee: Amada Company, Limited, Japan

[21] Appl. No.: 680,829

[22] Filed: Dec. 12, 1984

[30] Foreign Application Priority Data

Dec. 14, 1983 [JP] Japan .................. 58-234152

[51] Int. Cl.⁴ .................. B23D 53/04; B23D 55/04; B27B 13/04; B27B 25/00
[52] U.S. Cl. .................. 83/13; 83/800; 83/801
[58] Field of Search .................. 83/13, 800, 801, 794, 83/796, 42

[56] References Cited

U.S. PATENT DOCUMENTS

| | | | |
|---|---|---|---|
| 2,754,567 | 7/1956 | Crane | 83/820 X |
| 2,815,561 | 12/1957 | Crane | 83/402 X |
| 4,357,848 | 11/1982 | Sakurai et al. | 83/801 |
| 4,432,260 | 2/1984 | Sarurai et al. | 83/801 X |
| 4,534,247 | 8/1985 | Taguchi | 83/13 |

Primary Examiner—Donald R. Schran
Attorney, Agent, or Firm—Wigman & Cohen

[57] ABSTRACT

A method and apparatus for controlling the cutting of bandsaw machines includes continuous feeding of the bandsaw blade relative to the workpiece by alternating the speed at which the bandsaw blade is fed relative to the workpiece between fast and slow, so that the bandsaw blade is continuously periodically fed relative to the workpiece alternately fast and slow. In a first embodiment, the bandsaw blade is fed into the workpiece and a continuously operating control motor is used to control a flow valve to alternate the speed at which the bandsaw blade is fed into the workpiece. In a second embodiment, the workpiece is fed into the bandsaw blade and a continuously operating control motor is used to control a flow control valve to alternate the speed at which the workpiece is fed into the bandsaw blade. In a third embodiment, the bandsaw blade is fed into the workpiece and a continuously operating servo motor is used to drive a lead screw to alternate the speed at which the bandsaw blade is fed into the workpiece. In a fourth embodiment, the workpiece is fed into the bandsaw blade and a servo motor is continuously used to drive a lead screw to alternate the speed at which the workpiece is fed into the bandsaw blade.

8 Claims, 6 Drawing Figures

METHOD AND APPARATUS FOR CONTROLLING THE FEEDING OF A BANDSAW BLADE IN BANDSAW MACHINES

BACKGROUND OF THE INVENTION

1. Field of the Invention

The present invention relates generally to bandsaw machines having a flexible bandsaw blade trained around a plurality of wheels or pulleys to perform cutting operations and, more particlularly pertains to methods and apparatus for controlling the feeding of the bandsaw blade into workpieces to be cut in bandsaw machines.

2. Description of the Prior Art

The prior art concerning the present invention will be described, by way of example, about what is called a horizontal bandsaw machine, although the present invention is applicable not only to horizontal bandsaw machines but also to vertical bandsaw machines.

As is well known horizontal bandsaw machines comprise a base on which a workpiece or workpieces to be cut are to be placed and clamped and a cutting head assembly in which a flexible endlesss bandsaw blade is trained around a pair of wheels or pulleys, one of which is power driven to drive the bandsaw blade. In the cutting head assembly, the bandsaw blade is slidably held and guided with its cutting edge facing perpendicularly downwardly by a pair of guide means at the cutting zone where cutting is performed so that it may cut into the workpiece to be cut. The cutting head assembly is so arranged as to be raised away from and lowered toward the base by a hydraulic motor around a hinge pin or along one or more vertically disposed quide means. Thus, in each cutting cycle, the cutting head assembly is firstly raised and then lowered toward the base so as to enable the bandsaw blade being driven therein around the wheels to cut the workpiece which has been placed and clamped on the base.

In conventional bandsaw machines of the above described construction, a problem has been the fact that the bandsaw blade will be often deflected by the cutting resistance bacause of its flexible nature and will not cut into workpieces to be cut. The bandsaw blade will be deflected especially when cutting difficult-to-cut materials such as stainless steels and metal alloys which are generally hard and tough and are mostly subject to work hardening. When the bandsaw blade is deflected and cannot cut into workpieces, it will slide on the workpieces to be cut only to scratch them without performing any cutting, action with a result that a hard layer will be produced in kerfs of the workpieces because of work hardening. Such disadvantages with the conventional bandsaw machines will not only result in a lower cutting rate and a poor cutting accuracy but also will cause a short life of the bandsaw blade and a larger vibration and noise during cutting operations.

In order to solve the problems, the inventor invented a cutting method and apparatus in which the bandsaw blade will be intermittently fed and stopped from feeding into workpieces to be cut. In this arrangement, the bandsaw will be instantaneously stopped from feeding into the workpieces to be cut and then it will drastically into workpieces. Accordingly, the bandsaw blade will be effectively fed with impact into workpieces to be cut with a larger feeding force without scratching them even when cutting difficult-to-cut materials such as stainless steels and metal alloys which are subject to work hardening. However, it is disadvantageous that the bandsaw blade will be fed into workpieces to be cut with too large a feeding force and therefore each tooth of the bandsaw blade will be overworked under the too large feeding force and will be liable to brake. Also, since the bandsaw blade is mostly hydraulically controlled, it is further disadvantageous that shock waves in the hydraulic circuit have a harmful effect on the hydraulic equipment.

SUMMARY OF THE INVENTION

It is an object of the present invention to provide a method and apparatus for controlling the feeding of a bandsaw blade in bandsaw machines so that the bandsaw blade may be surely fed into workpieces to be cut without scratching them with no cutting action.

It is therefore another object of the present invention to provide a method and apparatus for controlling the feeding of a bandsaw blade in bandsaw machines so that the bandsaw blade may be properly fed into workpieces to be cut including those of difficult-to-cut materials which are subject to work hardening.

It is therefore another object of the present invention to provide a method and apparatus for controlling the feeding of a bandsaw blade in bandsaw machines so that the life of the bandsaw blade and the cutting accuracy may be increased and vibration and noise may be reduced even in cutting difficult-to-cut materials including those which are subject to work hardening.

It is a further object of the present invention to provide a method and apparatus which will control the feeding of a bandsaw blade in bandsaw machines so that shock waves may be prevented from occurring in the hydraulic circuit for moving the bandsaw blade to have no harmful effect on the hydraulic equipment.

In order to accomplish these objects, a bandsaw machine according to the present invention is provided with a controlling means for feeding the bandsaw blade into workpieces to be cut alternately fast and slow.

Other and further objects and advantages of the present invention will be apparent from the following description and accompanying drawings which, by way of illustration, show preferred embodiments of the present invention and the principle thereof.

BRIEF DESCRIPION OF THE DRAWINGS

DESCRIPTION OF THE PREFERRED EMBODIMENTS

Figure 1:
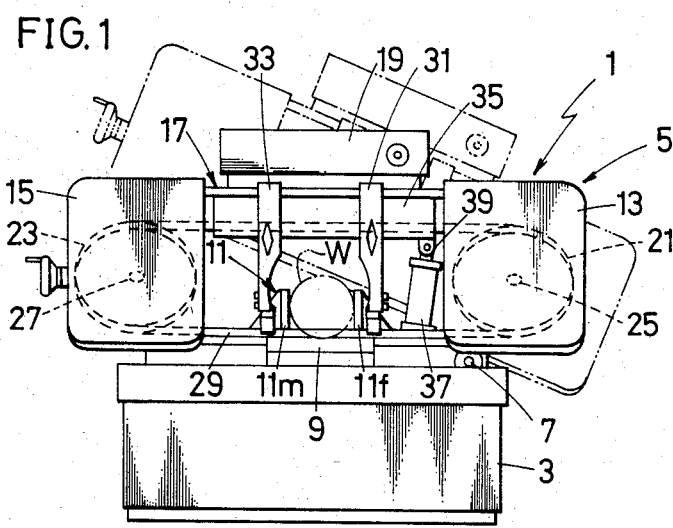
FIG. 1 is a front elevational view of a horizontal bandsaw machine embodying the principles of the present invention.

Referring to FIG. 1, the horizontal bandsaw machine 1 comprises a box-like base 3 and a cutting head assembly 5 which is pivotally connected to the base 3 by means of a hinge pin 7 to be movable up and down toward and away from the same. The base 3 is provided at its top with a work-table 9 on which a workpiece W to be cut can be placed, and the work-table 9 is provided with a vise assembly 11 which has a fixed jaw 11f and a movable jaw 11m to clamp the workpiece W therebetween. The cutting head assembly 5 has spaced housing sections 13 and 15 connected with each other by a beam member 17 and is provided at its top with a control box 19. In the cutting head assembly 5, a pair of a driving wheel 21 and a driven wheel 23 having shafts 25 and 27 respectively, are enclosed in the housing sections 13 and 15, respectively, and a flexible endless bandsaw blade 29 is trained therearound so that it may be driven to make a cutting action when the driving wheel 21 is power driven. The bandsaw blade 29 is slidably held or guided with its cutting edge facing perpendicularly downwardly by a pair of a fixed guide assmbly 31 and a movable guide assembly 33 so that a cutting stretch may be provided therebetween at the cutting zone of the horizontal bandsaw machine 1. The fixed and movable guide assemblies 31 and 33 are mounted on a guided way 35 which is fixed to the beam member 17 in a manner such that they depend therefrom in parallel with each other. The fixed quide assembly 31 is fixedly mounted on the guide way 35, while the movable guide assembly 33 is so mounted that it may be fixed on the guide way 35 in operation but may be moved toward and away from the fixed guide assembly 31. The movable guide assembly 33 is moved on the guide way 35 to adjust the cutting stretch of the bandsaw blade 29 according to the size of the workpiece W to be cut. Also, the cutting head assembly 5 of the above described construction is so arranged as to be swung up and down around the hinge pin 7 by a hydraulic motor 37 of a cylinder type having a piston rod 39 to feed and return the bandsaw blade 29 into and away from the workpiece W to be cut. Thus, the cutting head assembly 5 will be raised when the hydraulic motor 5 is supplied with the hydraulic fluid, and it will be lowered by its own gravity when the hydraulic fluid is drained from the hydraulic motor.

Figure 2:
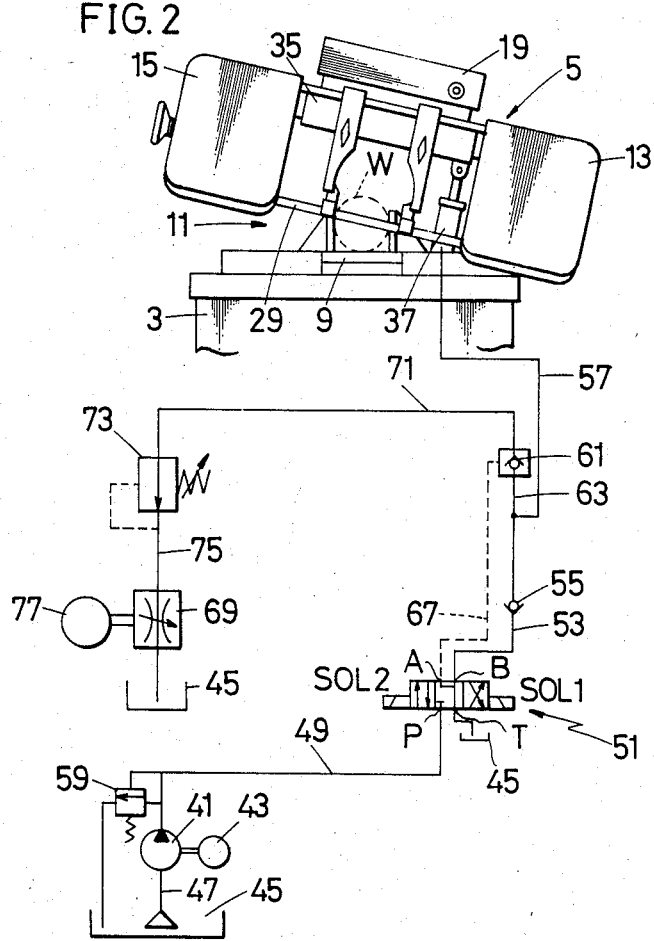
FIG. 2 is a diagrammatic illustration showing the horizontal bandsaw machine shown in FIG. 1 and its hydraulic circuit.

Referring to FIG. 2 the hydraulic motor 37 is so arranged as to be supplied with the hydraulic fluid by a hydraulic pump 41 which is driven by a motor 43 and is connected with a hydraulic tank 45 through a conduit 47. The hydraulic pump 41 is connected to the hydraulic motor 37 by a conduit 49, a solenoid operated valve assembly 51, a conduit 53, a check valve 55 and another conduit 57 to deliver the hydraulic fluid into the hydraulic motor 37. As is conventional, there is provided a relief valve 59 which is connected to the conduit 49 between the hydraulic pump 41 and the solenoid operated valve assembly 51 to return the hydraulic fluid to the hydraulic tank 45 at need. Also, a pilot operated check valve 61 is connected by a conduit 63 to the conduit 57 between the check valve 55 and the hydraulic motor 37 and it is further connected to the solenoid operated valve assembly 51 by a pilot conduit 67 for a purpose to be seen hereinafter. The solenoid operated valve assembly 51 is of a three position type having two solenoids SOL 1 and SOL 2 and four ports A, B, P and T. Also, the solenoid operated valve assembly 51 is so arranged that the ports A and B will be connected with the ports T and P, respectively, when the solenoid SOL 1 is energized and the ports A and B will be connected with the ports P and T, respectively, when the solenoid SOL 2 is energized. In the solenoid operated valve assembly 51, the port P is connected to the hydraulic pump 41 by the conduit 49, and the port T is connected to the hydraulic thank 45 by a drain conduit. Also, the ports A and B of the solenoid operated valve assembly 51 are connected to the pilot conduit 67 and the conduit 57, respectively, leading to the pilot operated check valve 61 and the check valve 55, respectively. The pilot operated check valve 61 is so arranged as to normally or usually block the hydraulic fluid in the hydraulic motor 37 but allow it to drain therethrough when acted on by the pilot pressure of the hydraulic fluid delivered through the pilot conduit 67 from the solenoid operated valve assembly 51. The check valve 55 is so arranged as to allow the hydraulic fluid to go to the hydraulic motor 37 from the solenoid operated valve assembly 51 but prevent it from going back therethrough. Thus, when the solenoid SOL 1 of the solenoid operated valve assembly 51 is energized, the hydraulic fluid will be delivered from the hydraulic pump 41 into the hydraulic motor 37 to raise the cutting head assembly 5. When the solenoid SOL 2 of the solenoid operated valve assembly 51 is energized, the hydraulic fluid from the hydraulic pump 41 will be applied to the pilot operated valve 61 to enable the hydraulic fluid in the hydraulic motor 37 to drain therethrough to lower the cutting head assembly 5.

Referring further to FIG. 2, the pilot operated check valve 61, which is connected with the hydraulic motor 37 by the conduits 63 and 57, is connected to a valve means such as a flow control valve assembly 69 so as to drain alternately fast and slow the hydraulic fluid from the hydraulic motor 37. The pilot operated check valve 61 is connected to the flow control valve assembly 69 through a conduit 71, a reducing valve 73 and a conduit 75. The reducing valve 73 is provided to adjustably control the hydraulic fluid prevailing in the hydraulic motor 37 to a desired pressure.

The flow control valve assembly 69 is so arranged as to continuously alternately increase and decrease the flow of the hydraulic fluid draining out of the hydraulic motor 37 by a suitable control motor 77 such as a servomotor or a stepping motor. More particularly, the control motor 77 is so arranged as to be continuously controlled by a suitable means such as a numerical control or computer to continuously control the flow control vavle assembly 69 so as to alternately increase and decrease the flow of the hydraulic fluid passing therethrough. Thus, the flow of the hydraulic fluid draining out of the hydraulic motor 37 will alternately be increased and decreased by flow control valve assembly 69 to lower the cutting head assembly 5 alternately fast and slow to feed the bandsaw blade 29 altermately fast and slow into the workpiece W to be cut.

In the above described arrangement, in operation the solenoid SOL 1 of the solenoid operated valve assembly 51 is firstly energized to supply the hydraulic fluid from the hydraulic pump 41 into the hydraulic motor 37 to raise the cutting head assembly 5 together with the bandsaw blade 29. Then, in order to lower the cutting head assembly 5 to enable the bandsaw blade 29 to cut the workpiece W, the solenoid SOL 1 of the solenoid operated valve assembly 51 is de-energized and simultaneously the solenoid SOL 2 of the same is energized, and also control motor 77 is put in motion. The solenoid operated valve assembly 51, will flow the hydraulic fluid through the pilot conduit 67 from the hydraulic pump 41 to enable the pilot operated check valve 61 to drain the hydralic fluid from the hydraulic motor 37 therethrough toward the flow control valve assembly 69. Also, the flow control valve assembly 69 will enable the hydraulic fluid to drain alternately fast and slow from the hydraulic motor 37 into the hydraulic tank 45 through the pilot operated check valve 61 when control motor 77 is in motion. Thus, when the solenoid SOL 2 of the solenoid operated valve assembly 51 is kept energized and the control motor 77 is kept in motion, the cutting head assembly 5 will be lowered alternately fast and slow to enable the bandsaw blade 29 to cut into the workpiece W alternately fast and slow.

As has been described above, the bandsaw blade 29, according to the present invention, will be fed alternately fast and slow into the workpiece W by the cutting head assembly 5 when the flow control valve assembly 69 is continuously controlled by the control motor 77. Accordingly, the bandsaw blade 29 will be fed into the workpiece without being overworked and therefore without being deflected but with a large feeding force which has been set to optimum for cutting the workpiece W. Therefore, the bandsaw blade 29 according to the present invention will not slide on the workpiece W nor scratch the same causing a work hardening, and it will make an accurate cutting action at a higher cutting rate and with less vibration and noise. Also, since the bandsaw blade will not only not slide on the workpiece W without making a cutting action but also will not be overworked, the life of the bandsaw blade 29 will be greately increased according to the present invention.

Furthermore, since the hydraulic fluid is continuously drained alternately fast and slow from the hydraulic motor 37 without stopping, shock waves will not occur in the hydraulic circuit that have a harmful effect on the hydraulic equipment as well as the bandsaw blade 29.

Figure 3:
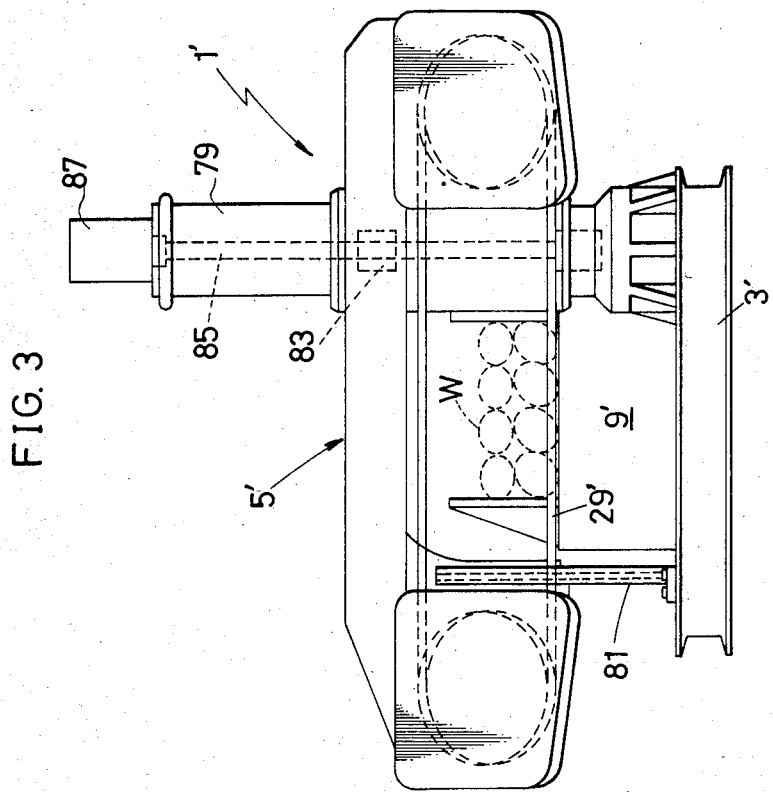
FIG. 3 is a front elevational view of a horizontal bandsaw machine showing another embodiment of the present invention.

Referring to FIG. 3, there is shown another embodiment of the present invention in which a horizontal bandsaw machine 1' comprises a cutting head assembly 5' which is so disposed as to be raised and lowered vertically along a main post 79 and an auxiliary post 81 to carry the bandsaw blade 29'. The main post 79 and the auxiliary post 81 are vertically disposed on a base 3' in paralled with each other to vertically guide the cutting head assembly 5' toward and away from the worktable 9'. Also, in this embodiment, the cutting head assembly 5' is so arranged as to be raised and lowered along the main and auxiliary posts 79 and 81 by a nut 83 and a lead screw 85 which is driven by a suitable means such as a servomotor 87. The nut 83 is fixed to a portion of the cutting head assembly 5', the lead screw 85 is vertically disposed along the main post 79 in engagement with the nut 83 and the servomotor 87 is mounted on the main post 79 so as to rotate and drive the lead screw 85. In this arrangement, when the lead screw 85 is rotated by the servomotor 87, the cutting head assembly 5' will be raised and lowered by the lead screw 85 through the nut 83 to raise and lower the bandsaw blade 29'. According to the present invention, the lead screw 85 is driven alternately fast and slow by the servomotor 87 to lower the cutting head assembly 5' alternately fast and slow so that the bandsaw blade 29' may be fed alternately fast and slow into the workpiece W. Thus, it will be understood that the horizontal bandsaw machine 1' shown in FIG. 3 can perform cutting actions in all the same manner as the horizontal bandsaw machine 1 shown in FIGS. 1 and 2 when the lead screw 85 is driven alternately fast and slow by the servomotor 87.

As has been far described in the above, the purposes of the present invention can be accomplished by providing a bandsaw machine with a means for feeding the bandsaw blade into workpieces to be cut alternately fast and slow. However, it will be understood that the purposes of the present invention can be attained by providing a means for feeding workpieces to be cut into a bandsaw blade alternately fast and slow, although the bandsaw blade has been described as fed into workpieces in the preferred embodiments. Accordingly, the present invention is applicable not only to horizontal bandsaw machines but also to vertical bandsaw machines in which workpieces to be cut are moved and fed into a bandsaw blade which is driven at a fixed position.

Figure 4:
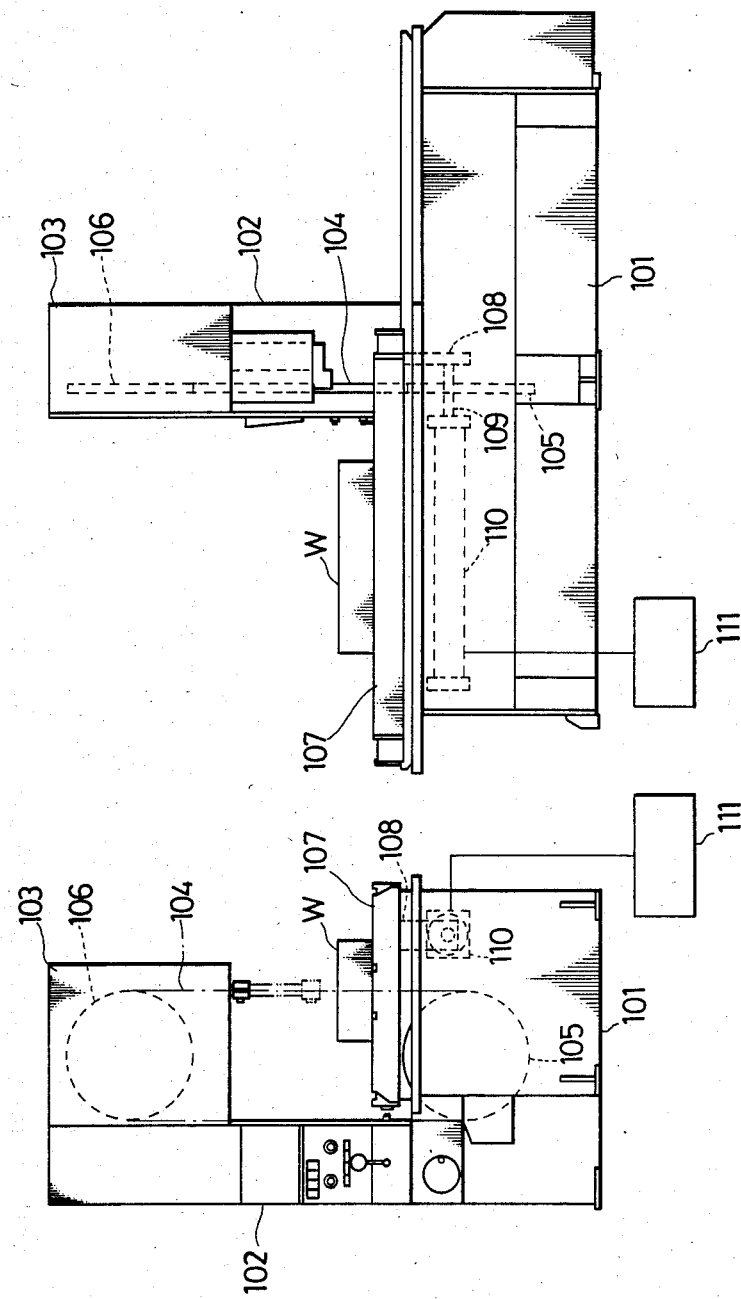
FIGS. 4A and 4B are side and front elevational views respectively of a vertical bandsaw machine showing an additional embodiment of the present invention.

Referring now to FIGS. 4A and 4B, a vertical bandsaw machine in which workpieces to be cut are fed by hydraulic means into a bandsaw blade which is driven at a fixed position is illustrated. The vertical bandsaw machine comprises a base 101 provided with a column 102 on which a frame 103 is supported. A bandsaw blade 104 is trained around a driving wheel 105, supported in base 101, and a driven wheel 106, supported in frame 103. Driving wheel 105 is adapted to be driven by any suitable means which are apparent to one skilled in the art and which do not constitute, per se, a part of the present invention.

A sliding worktable 107 is appropriately mounted for sliding movement on base 101. Worktable 107 is provided with a suitable clamp for clamping a workpiece W. Worktable 107 supports a bracket 108 which is connected with the piston rod 109 of a hydraulic cylinder or motor 110 which is rigidly mounted in base 101. A controlling means 111 is connected to hydraulic cylinder 110. Controlling means 111 is the same as the hydraulic circuit which is illustrated in FIG. 2 of the drawings, and is accordingly not illustrated in further detail in FIGS. 4A and 4B.

In operation, a workpiece W is clamped in worktable 107 and driving wheel 105 is driven to continuously drive bandsaw blade 104. Controlling means 111, which includes a flow control valve means, is operated to alternately increase and decrease the flow of hydraulic fluid to hydraulic cylinder or motor 110, while continuously displacing piston rod 109 and bracket 108. Workable 107, carrying workpiece W, is thereby continuously fed, alternately fast and slow, into bandsaw blade 104.

Figure 5:
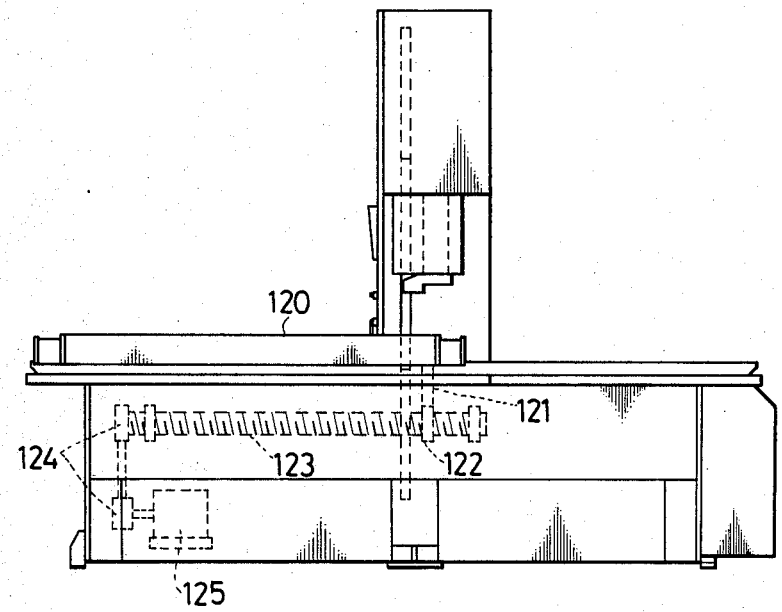
FIG. 5 is a front elevational view of a vertical bandsaw machine showing a further embodiment of the present invention.

Referring now to FIG. 5, an additional embodiment of a vertical bandsaw machine is illustrated. The embodiment of FIG. 5 is similar to the embodiment of FIGS. 4A and 4B in that the bandsaw blade, while being rotated for cutting, is held at a fixed position while the workpiece is moved into the bandsaw blade to effect cutting. Accordingly, similar components of the bandsaw machine of FIG. 5 will not be described in greater detail. The bandsaw machine on FIG. 5 differs from the embodiment illustrated in FIGS. 4A and 4B in that the workable is fed by a screw means, instead of by a hydraulic motor. Sliding worktable 120, which is mounted for sliding movement similar to the embodiment of FIGS. 4A and 4B, supports a bracket 121. A nut 122 is mounted in bracket 121 and mates with a lead screw 123 which is rigidly fixed to the base of the bandsaw machine. Lead screw 123 is connected at one end through a pulley 124 to a servo motor 125, which is mounted on the base of the bandsaw machine and arranged so as to rotate and drive the lead screw 123.

In accordance with the present invention, the lead screw 123 is continuously driven alternately fast and slow by the servo motor 125 so that a workpiece clamped to worktable 120 is continuously fed alternately fast and slow into the bandsaw blade. Thus, it will be understood that the vertical bandsaw machine of FIG. 5 performs cutting action in the same manner as the vertical bandsaw machine of the embodiment of FIGS. 4A and 4B.

Although a preferred form of the present invention has been illustrated and described, it should be understood that the device is capable of modification by one skilled in the art without departing from the principles of the invention. Accordingly, the scope of the invention is to be limited only by the claim appended hereto.

I claim:

1. A cutting controlling method for bandsaw machines, comprising:
   continuously driving a bandsaw blade;
   continuously feeding the bandsaw blade into a workpiece; and using a continuously operating control motor to control a flow control valve to alternate the speed at which the bandsaw blade is fed into the workpiece between fast and slow, so that the bandsaw blade is continuously periodically fed into the workpiece alternately fast and slow.

2. A cutting controlling method for bandsaw machines, comprising:
   continuously driving a bandsaw blade;
   continuously feeding a workpiece into the bandsaw blade; and using a continuously operating control motor to control a flow control valve to alternate the speed at which the workpiece is fed into the bandsaw blade between fast and slow, so that the workpiece is continuously periodically fed into the bandsaw blade alternately fast and slow.

3. A cutting controlling apparatus for a bandsaw machine, comprising:
   means for continuously driving a bandsaw blade;
   means for continuously feeding the bandsaw blade into a workpiece; and means for controlling the feeding means to work the same alternately fast and slow, wherein the feeding means is a hydraulic motor for raising and lowering the bandsaw blade and the controlling means comprises a contiuously operating control motor connected to a flow control valve means which is adapted to alternately increase and decrease the flow of the hydraulic fluid from the hydraulic motor.

4. A cutting controlling apparatus for a bandsaw machine, comprising:
   means for continuously driving a bandsaw blade;
   means for continuously feeding the bandsaw blade into a workpiece; and means for controlling the feeding means to work the same alternately fast and slow, wherein the feeding means is a screw means for raising and lowering the bandsaw blade and the controlling means is a continuously operating motor means which is adapted to drive the screw means alternately fast and slow.

5. A cutting controlling apparatus for a bandsaw machine, comprising:
   means for continuously driving a bandsaw blade;
   means for continuously feeding a workpiece into the bandsaw blade; and means for controlling the feeding means to displace the same alternately fast and slow, wherein the feeding means is a hydraulic motor for continuously displacing the workpiece and the controlling means comprises a continuously operating control motor connected to a flow control valve means which is adapted to alternately increase and decrease the flow of the hydraulic fluid from the hydraulic motor.

6. A cutting controlling appatatus for a bandsaw machine, comprising:
   means for continuously driving a bandsaw blade;
   means for continuously feeding a workpiece into the bandsaw blade; and means for controlling the feeding means to displace the same alternately fast and slow, wherein the feeding means is a screw means for continuously displacing the workpiece and the controlling means is a motor means which is adapted to drive the screw means alternately fast and slow.

7. A cutting controlling method for bandsaw machines, comprising:
   continuously driving a bandsaw blade;
   continuously feeding the bandsaw blade into a workpiece; and using a continuously operating servomotor to drive a lead screw to alternate the speed at which the bandsaw blade is fed into the workpiece between fast and slow, so that the bandsaw blade is continuously periodically fed into the workpiece alternately fast and slow.

8. A cutting controlling method for bandsaw machines, comprising:
   continuously driving a bandsaw blade;
   continuously feeding a workpiece into the bandsaw blade; and continuously using a servomotor to drive a lead screw to alternate the speed at which the workpiece is fed into the bandsaw blade between fast and slow, so that the workpiece is continuously periodically fed into the bandsaw blade alternately fast and slow.

* * * * *